N. PEARSON.
CLEVIS.
APPLICATION FILED JAN. 10, 1919.
1,299,018.
Patented Apr. 1, 1919.
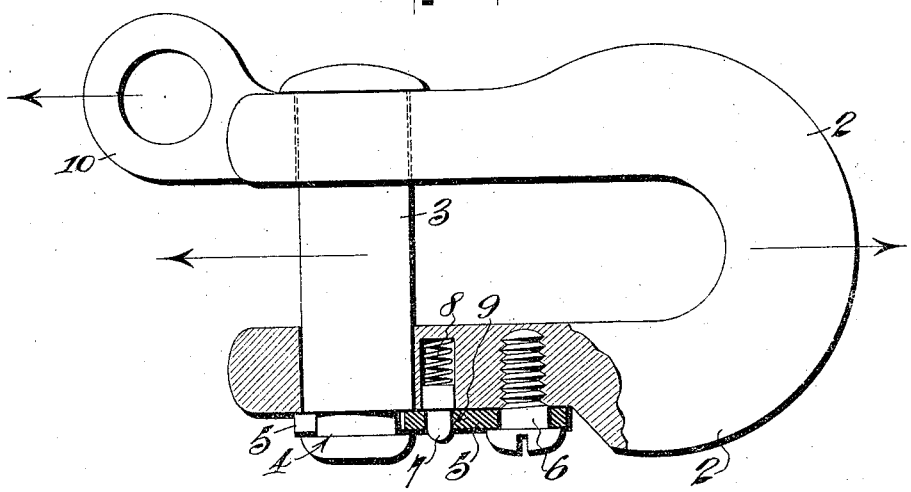
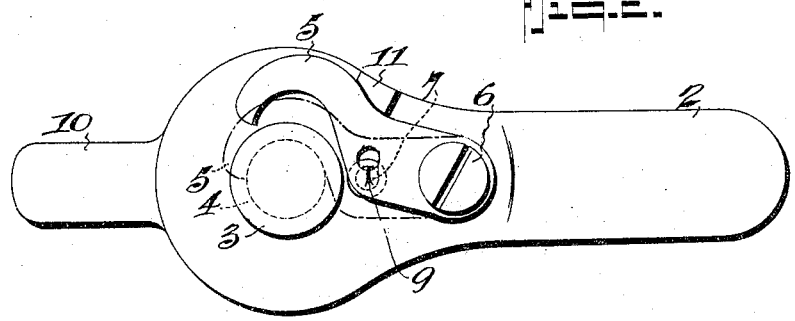
INVENTOR
Nels Pearson.
BY
Fred G Dieterich & Co
ATTORNEYS

UNITED STATES PATENT OFFICE.

NELS PEARSON, OF VANCOUVER, BRITISH COLUMBIA, CANADA, ASSIGNOR TO OSCAR LINDGREN, OF VANCOUVER, BRITISH COLUMBIA, CANADA.

CLEVIS.

1,299,018.             Specification of Letters Patent.      Patented Apr. 1, 1919.

Application filed January 10, 1919. Serial No. 270,555.

*To all whom it may concern:*

Be it known that I, NELS PEARSON, a subject of the King of Sweden, residing at Vancouver, in the Province of British Columbia, Canada, have invented certain new and useful Improvements in Clevises, of which the following is a specification.

This invention relates to a clevis or shackle which has been particularly designed to connect the main line of a wire rope haul to the tag line and haul-back line of the same.

The pin of such a shackle by which connection is made and broken requires to be quickly removed and re-connected, when necessary, and the releasing means must be secure against accidental release under the trying conditions of being dragged in either direction along the ground or over the rough surfaces of a skid road or a logging track.

The invention is particularly described in the following specification, reference being made to the drawings by which it is accompanied, in which:

Figure 1 is a plan and part section through the pin securing means, and

Fig. 2 is a side view of the same.

In these drawings 2 represents an ordinary bent shackle, the ends of which are formed as eyes to receive the headed shackle pin 3. The end of this pin 3 outside the shackle eye is circumferentially grooved, as at 4, to receive a flat pin securing hook 5 which is pivotally mounted at 6 in the adjacent shank of the shackle. This hook 5 is adapted to fit the groove 4 of the shackle pin through approximately half of its circumference, and its movement outward from that groove is limited by a stop 11.

This hook member 5 is retained in the shackle pin securing position by a pin 7, the end of which is shouldered to project outward into an aperture 9 in the hook member under the influence of a light spring 8.

The shouldered pin 7 positively retains the hook 5 in the groove 4 of the shackle pin, so that the pin cannot be accidentally withdrawn, for it will be noted that the pin 7 must be pushed inward against the resistance of its spring and below the flush of the underside of the hook before the hook can be turned, which inward movement cannot be accidentally effected.

Further the pin securing means does not project in a manner to catch on obstructions so as to meet with injury in use.

When it is required to remove the shackle pin 3 the shouldered locking pin 7 may be readily pressed in by a piece of stick or the like, against the spring 8 and the hook may then be pivotally turned aside against the stop 11 where it is clear of the groove 4 of the shackle pin 3 and that pin can be withdrawn.

Where the shackle is to be used in the work for which it has been particularly designed, viz., to connect the main hauling line to the tag line and haul-back line of a wire rope log haul, an eye 10 is forged in the opposite end of the shackle to that which is provided with the pin retaining means, the axis of which eye 10 is at right angles to that of the shackle 2.

In this case the main hauling line is connected to the loop of the shackle 2, the tag line by which the logs are connected to the hauling line is connected to the shackle pin 3 and the haul-back line to the supplementary eye 10, as indicated by the arrows in Fig. 1.

This supplementary eye 10 is, however, not an essential requirement.

The device is simple to construct and has proved itself most effective in use, meeting the approval of several practical loggers who have tried it.

The provision of safety against accidental release, freedom from projections to catch on obstructions, and the readiness with which the clevis pin may be released when required are the important features of the invention.

Having now particularly described my invention, I hereby declare that what I claim as new and desire to be protected in by Letters Patent, is:

1. A main line clevis, comprising in combination, a bent shackle having eyed ends, a headed shackle pin, the end of which opposite the head has a circumferential groove, a hook pivotally mounted on the outer side of the shackle eye to move in the plane of its outer side, said hook adapted to fit the circumferential groove of the shackle pin and to be released from such engagement, and releasable means for positively securing the retaining hook in the position of engagement in the groove of the shackle pin.

2. A main line clevis, comprising in combination, a bent shackle having eyed ends, a headed shackle pin, the end of which opposite the head has a circumferential groove outside the shackle eye, a retaining hook adapted to fit the circumferential groove of the shackle pin and pivotally mounted on the shackle to turn in the plane of the outer side of the shackle eye, a shouldered retaining pin inserted in an aperture in the shackle and adapted to pass into an aperture in the hook member and positively retain that member in the position for securing the pin against displacement, and a spring pressing the retaining pin outward.

3. A main line clevis, comprising in combination, a bent shackle having eyed ends through which a headed pin may be inserted and a supplementary eye formed on one end of the shackle, a headed shackle pin, the end of which has a circumferential groove, and a retaining hook pivotally mounted on the outer side of the shackle to move in the plane of the outside of the eye and engage the groove of the shackle pin, and releasable means for positively securing the hook in the position for securing the pin against displacement.

In testimony whereof I affix my signature.

NELS PEARSON.

Copies of this patent may be obtained for five cents each, by addressing the "Commissioner of Patents, Washington, D. C."